June 30, 1942.    E. E. PETERMAN    2,287,944
DEVICE FOR USE IN HANDLING LOOSE BULK MATERIAL
Filed May 3, 1940    2 Sheets—Sheet 1

Inventor
Elmer E. Peterman
By Richmond A. Hayes
Attorney

June 30, 1942.   E. E. PETERMAN   2,287,944
DEVICE FOR USE IN HANDLING LOOSE BULK MATERIAL
Filed May 3, 1940   2 Sheets-Sheet 2

Inventor
Elmer E. Peterman
By Richmond S. Hays
Attorney

Patented June 30, 1942

2,287,944

UNITED STATES PATENT OFFICE 2,287,944

DEVICE FOR USE IN HANDLING LOOSE BULK MATERIAL

Elmer E. Peterman, Jamestown, N. Y.

Application May 3, 1940, Serial No. 333,165

5 Claims. (Cl. 214—10)

This invention relates to a device for use in handling large quantities of loose bulk material.

The invention more particularly relates to a structure for use in handling quantities of loose bulk material, such as coal, sand, gravel, etc., that is generally stored in a yard or bin. The structure is of the nature of a unital or sectional tunnel and is located generally centrally of the floor of the yard or bin. The tunnel is of sufficient length to extend forwardly beyond the edge of a pile of material in the bin or yard and, being open-ended, gives ready access to the conveyor of a conventional portable loading device. Suitable closures on the upper surface of each tunnel unit are readily removable. As these closures are successively removed, the material falls by gravity into the tunnel onto the conveyor, from whence it may be mechanically loaded on a truck through the use of a further loading device, substantially as illustrated in the drawings. As the pile of material recedes, the foremost unit of the tunnel may be removed, the conveyor of the loading device advanced into the tunnel, and further closures removed.

One of the objects and advantages of the invention lies in the provision of means that facilitates the efficient use of a portable loading device in removing bulk material from a storage yard or bin.

Another object of the invention lies in the provision of a tunnel located beneath a pile of bulk material, access to the end of which may be had by the conveyor of a portable loading device and into which the material may flow as suitable closures are successively removed.

Another object of the invention lies in the provision of a tunnel consisting of portable units or sections for use with a conventional loading device in the removal of bulk material from storage bins or yards.

Another object of the invention lies in the provision of a tunnel for use with a portable loading device that is easily installed in any part of a storage bin or yard.

Another object of the invention lies in the provision of a sectional or unital tunnel for storage bins or yards, each unit of which is strong, light in weight, and of inexpensive manufacture.

Other and further objects of the invention will be more fully understood from a consideration of the following specification, taken in conjunction with the accompanying drawings; and in which Figure 1 is a perspective view showing the invention cooperating with a portable loading device in the transfer of bulk material from a storage bin to a truck;

Figure 1:
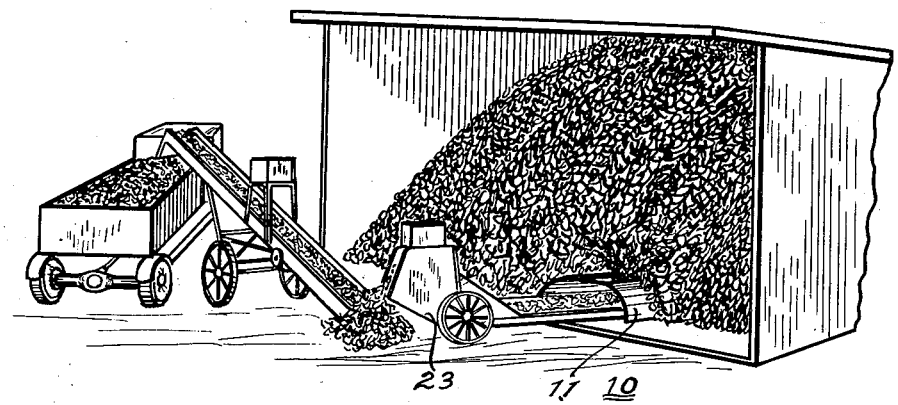
Figure 2:
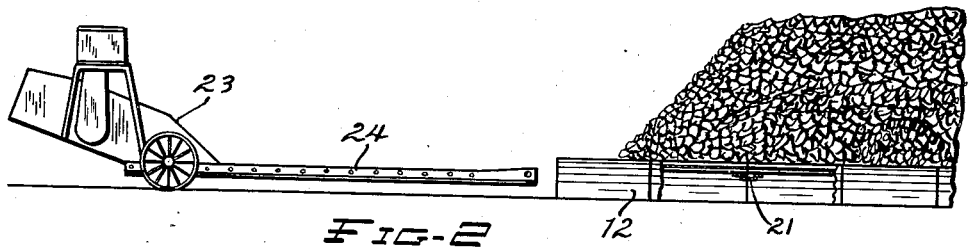
Figure 2 is a side elevational view of the invention in position of use and the conveyor of a loading device ready to be projected thereinto.

Reference is now had to the drawings wherein the numeral 10 is employed to generally designate a storage bin or yard in which one form of the invention has been located prior to filling with loose bulk material such, for example, as coal. The invention consists of a tunnel 11 that may extend from adjacent the front to the rear of the bin. The tunnel 11 is made up of identical units 12, any number of which may be connected together to form a passageway beneath the stored material.

In the present form of the invention, each unit 12 of the tunnel includes upstanding side walls 13 that are curved inwardly toward each other and terminate in slightly depressed ledges 14. The lower edge of each wall may be formed with a base flange 16. The walls 13 are rigidly secured in spaced parallel relationship by means of angle or other brace members 17. The members 17, of which there may be two or more, are welded or otherwise joined to the under surface of the curved portion of each of the walls 13, as well as to the ledges 14. The ledges 14 provide a track for one or more slidable covers 18. The covers are each provided with a handle 19, preferably located adjacent corresponding ends.

The side walls 13 of each unit, although formed from relatively light weight material, are adequate to withstand considerable weight of material piled thereon. This is due to the fact that these walls, commencing with the base flanges 16, are curved increasingly inwardly, and the weight of material on the unit does not tend to collapse it but rather to spread apart the base flanges 16. However, by the time sufficient weight is on the unit to spread the base flanges, material has been piled around the unit and tends to prevent spreading thereof. This is clearly illustrated in Figure 1 of the drawings.

It has been found preferable to provide means for temporarily connecting and securing abutting units. In one form this consists of a hook member 21 that is permanently joined centrally of one of the brace members 17. The brace member at the end opposite the hook 21 may be formed with a downwardly opening notch or slot 22. As may be seen in Figure 3 of the drawings, the hook 21 projects through the notch 22 and engages a portion of the depending flange of brace member 17. As desired, the outermost unit may be removed by lifting slightly on the free end, thus tipping the hook 21 downwardly out of engagement with the adjacent unit.

Figure 3:
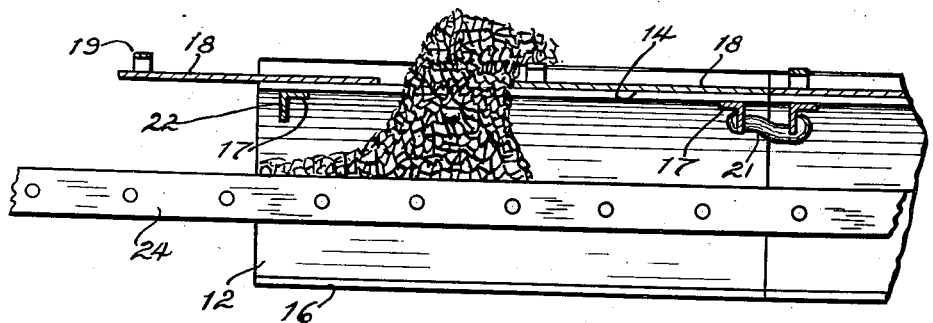
Figure 3 is an enlarged fragmentary vertical sectional view of the tunnel showing one type of fastener that may be used to align and connect adjacent units, as well as the position within the tunnel of the conveyor of a loading device.
Figure 4:
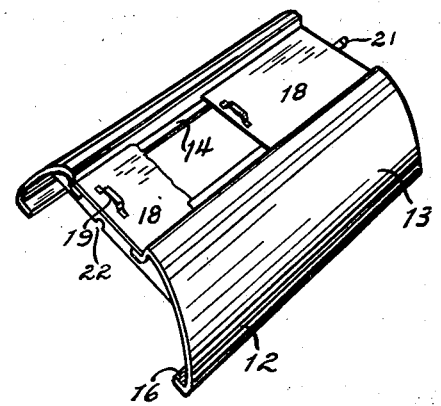
Figure 4 is a perspective view of one of the units that go to make up a tunnel and in which two slidable covers are provided.
Figure 5:
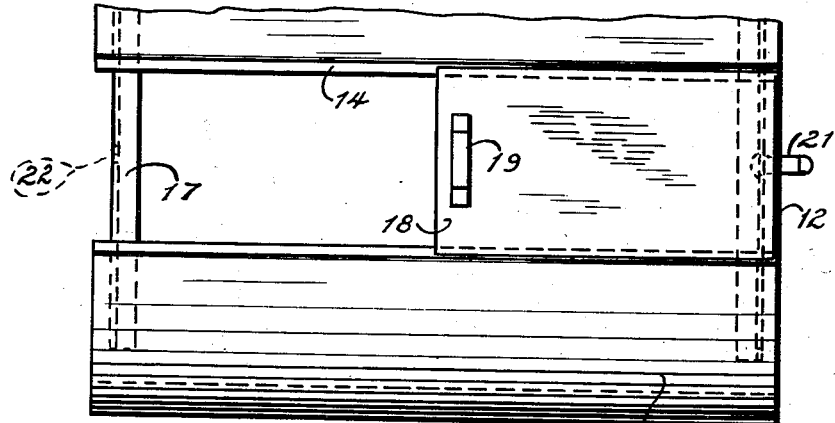
Figure 5 is an enlarged fragmentary plan view of one of the tunnel units showing certain of the structural details.
Figure 6:
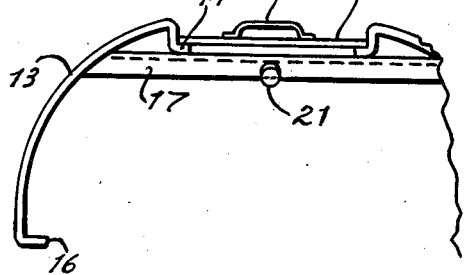
Figure 6 is a vertical transverse sectional view taken substantially as indicated at 6—6 of Figure 5.

In order that the invention may be fully appreciated, attention is directed to one of many uses, such as in the yards of a retail coal or gravel supply company. It is assumed that the bin 10, indicated in Figure 1 of the drawings, or any other suitable area, is to constitute storage space for a quantity of coal. A number of units, commencing at the rear of the bin, are set up and connected to form a continuous tunnel. Since the tunnel is comprised of portable units, it may be located at the most desirable position within the bin or yard, or, if the bin is of unusually large proportions, several such tunnels may be set up. Following assembling the tunnel, the coal or other material is piled in the bin in any well known manner, such, for example, as the cooperative use of two or more endless conveyor loading devices. All but the free end of the outermost unit is concealed beneath the pile of material. When it is desired to remove a small quantity of material from the pile in the bin onto a truck, a portable loading device 23 is utilized. This device is of conventional design and includes a low horizontally disposed conveyor 24 that may be projected into the open end of the tunnel, being of greater length than the length of one of the tunnel units. Following this, the outermost cover 18 is removed, substantially as indicated in Figure 3. The material now flows by gravity through the unit onto the conveyor 24. The loading device is put in operation and as the material falls onto the conveyor it is removed. When the surface of the pile of material has receded so that it will no longer flow into the opening in the unit by gravity, a further cover is removed. Following this, the first unit will be uncovered and may be readily disengaged and removed. After which the loading device is moved further into the tunnel.

While it is apparent that the entire pile of material in the bin or yard cannot be removed without a certain amount of hand shoveling, it is evident that the greater portion of the pile may be more quickly removed in this manner than by hand shoveling from a pile to a conveyor or direct to a truck.

Although applicant has shown and described only one specific structure, it will be evident to those skilled in the art that the proportions of the units of the tunnel, together with their means of securement, may be modified without departing from the spirit and scope of the invention as defined in the hereunto annexed claims.

Having thus set forth my invention what I claim as new and for which I desire protection by Letters Patent is:

1. A device facilitating use of a conveyor loader in the handling of loose bulk material comprising a plurality of units, each of said units having spacedly joined upstanding sides, that define a full length top opening, a removable cover mounted on said sides to close said opening and cooperating therewith to provide an open-ended passageway and means for aligning said units to provide a tunnel into which the conveyor of said loader may be projected.

2. A device facilitating use of a conveyor loader in the handling of quantities of loose bulk material comprising a plurality of identical units, each of said units having spaced inwardly curved side walls, means securing said walls in spaced relationship, a cover mounted on and cooperating with said walls to provide an open ended passageway, and means for connecting and aligning said units whereby to provide a tunnel into which the conveyor of said loader may be projected.

3. An open-ended tunnel for receiving the conveyor of a loading device in the handling of loose bulk material comprising a plurality of identical units, each of said units having side walls curved increasingly inwardly toward the upper edges thereof, means permanently securing the upper edges of said walls in spaced relationship, a removable cover carried by and cooperating with said walls to form an open-ended passageway, and means for temporarily connecting and aligning said units in end to end tunnel-like relationship.

4. A tunnel of the class described comprising a plurality of substantially identical units, each of said units having spaced side walls, means connecting the upper edges of said side walls without closing the space therebetween, said side walls being flared outwardly and downwardly and terminating in base flanges, at least one cover member carried by the upper edges of the side walls of each unit, said cover member being removable from the unit, and means for aligning and releasably connecting said units in end to end relationship.

5. A tunnel of the class described consisting of a plurality of identical units, each of said units comprising spaced side walls, said side walls, commencing from the bottom edges thereof, being curved increasingly inwardly and terminating in edge flanges, means permanently joining said side walls adjacent said flanges, a cover supported on said flanges, and interfitting means on corresponding ends of said units, said means serving to temporarily connect and align said units whereby to form a continuous passageway or tunnel.

ELMER E. PETERMAN.